(12) United States Patent
Toda

(10) Patent No.: US 8,335,011 B2
(45) Date of Patent: Dec. 18, 2012

(54) PRINTING CONTROL APPARATUS HAVING A PLURALITY OF BOX AREAS AND PRINTING CONTROL METHOD

(75) Inventor: Masanari Toda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1381 days.

(21) Appl. No.: 11/285,557

(22) Filed: Nov. 22, 2005

(65) Prior Publication Data

US 2006/0109493 A1 May 25, 2006

(30) Foreign Application Priority Data

Nov. 25, 2004 (JP) ................................. 2004-340803

(51) Int. Cl.
*G06F 15/00* (2006.01)
(52) U.S. Cl. ....... 358/1.9; 358/1.13; 358/1.15; 358/1.16
(58) Field of Classification Search ................... 358/1.9, 358/1.13, 1.15, 1.16
See application file for complete search history.

(56) References Cited

U.S. PATENT DOCUMENTS

| | | | |
|---|---|---|---|
| 6,331,900 B1* | 12/2001 | Kuno | 358/1.9 |
| 7,325,052 B1* | 1/2008 | Motoyama | 709/223 |
| 7,884,954 B2* | 2/2011 | Endoh | 358/1.15 |
| 2001/0029513 A1* | 10/2001 | Kuwano et al. | 707/522 |
| 2003/0220125 A1* | 11/2003 | Ito et al. | 455/550.1 |
| 2005/0195434 A1* | 9/2005 | Ohara et al. | 358/1.16 |
| 2006/0164685 A1* | 7/2006 | Kobayashi | 358/1.18 |

FOREIGN PATENT DOCUMENTS

| | | |
|---|---|---|
| JP | 04-130882 | 5/1992 |
| JP | 2001-282477 | 10/2001 |

* cited by examiner

*Primary Examiner* — Benjamin O Dulaney
(74) *Attorney, Agent, or Firm* — Cowan, Liebowitz & Latman, P.C.

(57) ABSTRACT

Provided are a printing control apparatus and method in which the storage capacity of a hard disk in an information processor is not exploited unnecessarily because identical data that has been distributed to a plurality of users is not stored in a plurality of personal boxes within the information processor, and in which output of such data by the users who manage respective ones of the personal boxes can be managed appropriately by the original distributor of the data. A control unit receives a job instructing storage of prescribed data upon designating one or a plurality box areas in an image input/output system equipped with a personal box function and having a plurality of box areas capable of storing data. Based upon the job, the control unit stores the image data in a prescribed box area and outputs the image data from the prescribed box area. If a job for which storage of the image data in a plurality of box areas has been instructed is received, the control unit stores the image data in a common box area with which the image input/output system has been further provided for the purpose of storing common image data and stores linking information, which provides a link to this image data, in the plurality of box areas.

7 Claims, 14 Drawing Sheets

FIG. 11

| STORAGE DESTINATION | | |
|---|---|---|
| NAME OF DATA TO BE STORED (D) | | |
| ⦿ DESIGNATE BY MANUAL INPUT | | |
| NAME (N): [          ] | | |
| ○ USE FILE NAME | | |

BOX (L):

| BOX NO. | BOX NAME | MAXIMUM NUMBER OF COPIES — 143 |
|---|---|---|
| 0 | | |
| 1 | | |
| 2 | | 1 |
| 3 | | 1 |
| 4 | | 2 |
| 5 | | 1 |
| 6 | | 3 |
| 7 | | |
| 8 | | |

144 — ☑ PRINT NUMBER OF COPIES (C)
145 — ☑ DELETE AUTOMATICALLY AFTER UPPER-LIMIT NUMBER OF COPIES IS PRINTED

[ OK ]   [ CANCEL ]   [ HELP (H) ]

FIG. 13

| | |
|---|---|
| JOB-TYPE INFORMATION (BOX) | ~1601 |
| NUMBER OF DESIGNATED BOXES | ~1602 |
| BOX NO. | ~1603 |
| NUMBER OF OUTPUT COPIES ALLOWED | ~1604 |
| BOX NO. | ~1605 |
| NUMBER OF OUTPUT COPIES ALLOWED | ~1606 |
| STORED FILE NAME | ~1607 |
| USER NAME | ~1608 |
| COPY-NUMBER FLAG | ~1609 |
| PASSWORD | ~1610 |
| DELETION FLAG | ~1611 |
| PRINT DATA PORTION | ~1612 |

PRINTING CONTROL APPARATUS HAVING A PLURALITY OF BOX AREAS AND PRINTING CONTROL METHOD

FIELD OF THE INVENTION

The present invention relates to a printing control apparatus, which has a personal box function, for storing and outputting data, and to a related printing control method.

BACKGROUND OF THE INVENTION

In general, digital copiers, besides having copy functions such as functions for copying and printing, also come equipped with multiple other functions. Included among such digital copiers are those provided with a function for expanding image data read from a scanner or PDL data received from a host computer via a network, thereby obtaining image data, storing the image data temporarily in a storage device such as a hard disk, and repeatedly reading and printing any image data from the storage device.

In digital copiers of the kind described above, some implement a personal box function for allowing data such as a classified document that a user does not wish to be seen by others to be printed out by the user him/herself who handles the classified document, etc. The "personal box function" refers to a function whereby private image data is stored in an area specified beforehand and provided in a storage device such as a hard disk and the image data is read out of this storage area and printed if the user has been authenticated using personal authentication information such as a password.

By way of example, in a case where data relating to a classified document is created and printed out in a digital copier, the created data is stored temporarily in a previously specified area of a storage device using the above-described personal box function. The user subsequently inputs a password via a control panel on the digital copier. In response to input of the password, the data relating to the classified document is read out of the previously specified area of the storage device and is printed out. By thus utilizing the personal box function, data not wished to be seen by others can be printed out only by the user who created the data or by another user having the privilege without this data being seen by others.

With digital copiers of the kind described above, in order to avoid the area of the storage device provided in support of the personal box function from becoming so full that new data cannot be stored in this storage area, it is possible for data that has been stored in this area to be erased by the user at any time. Further, such a digital copier is so adapted that if data that has been stored in the storage device is not output within a fixed period of time, then the data is deleted automatically (for example, see the specification of Japanese Patent Application Laid-Open No. 2001-282477).

Furthermore, there is increasing demand for security enhancement in digital copiers of the above-described kind, and these copiers generally also have an encryption function for encrypting print data from a host computer and a function for enhancing the security of the hard disk per se, which constitutes the personal boxes. Moreover, there are also such copiers that have a so-called "copy-number print function" as a security function. This function has the management of output print matter as its purpose. According to this function, when a plurality of copies of a document are printed, a specific position on the printed surface is printed with a number whereby the number of the copy of this printed matter can be distinguished, thereby facilitating post-output document management. Further, the starting number or printed position of a copy number can be specified using a printer-driver UI (user interface) or control panel, whereby a value obtained by counting up from a specified number is printed as the copy number.

Personal boxes can be used in a variety of ways. For example, a plurality of personal boxes can be assigned to respective ones of users who utilizes a digital copier and a specific job can be stored via a host computer or scanner in the area assigned to each user, thereby making it possible to utilize this personal box as an information delivery box.

However, the following problems arise when an identical job of the above-mentioned kind is stored in a plurality of boxes:

(1) Management of output matter is difficult. That is, when printed matter consisting of identical data that has been stored in a plurality of personal boxes arrives, it is difficult to specify the personal box that was the source of the printout. Further, since the administrator of data at the moment the data arrives in a personal box is the administrator of the respective personal box, a limitation cannot be imposed upon the number of output copies at the source of the output.

(2) Owing to storage of data (e.g., image data, etc.) generated from the same job in a plurality of personal boxes, the storage capacity of the hard disk is exploited unnecessarily.

SUMMARY OF THE INVENTION

Accordingly, an object of the present invention is to provide a printing control apparatus and method in which the storage capacity of a hard disk in an information processor is not exploited unnecessarily because identical data that has been distributed to a plurality of users is not stored in a plurality of personal boxes within the information processor, and in which output of such data by the users who manage respective ones of the personal boxes can be managed appropriately by the original distributor of the data.

According to the present invention, the foregoing object is attained by providing a printing control apparatus having a plurality of box areas for storing entered image data and equipped with a box printing function for outputting the image data, which has been stored in the box areas, to a printing unit, comprising: receiving means for receiving a print job for which a plurality of box areas of the printing control apparatus have been specified; storage control means for storing the image data in a common box area, with which the printing control apparatus is further provided for the purpose of storing common image data, if the receiving means has received the print job for which storage in a plurality of box areas has been instructed; and correlating means for correlating the plurality of box areas instructed by the print job and the image data, which has been stored in the common box area, using linking information.

Further, the printing control apparatus of the present invention is such that if the receiving means has received the print job specifying one box area and instructing that the image data be stored, then the storage means stores the image data in the box area instructed by the print job without storing the image data in the common box area.

Further, the printing control apparatus of the present invention further comprises an image forming function; and output control means which, when a copy-number print function is implemented and the image data is formed on a recording medium and output using the image forming function, is for outputting the image data in such a manner that a serial number of the image data is also formed on the recording medium and output.

Further, the printing control apparatus of the present invention is such that the output control means forms the serial number regarding the image data when it outputs the image data that is based upon the linking information that has been stored in a separate box area that is based upon the same print job.

Further, the printing control apparatus of the present invention is such that if the receiving means has received the print job for which storage of the image data in a plurality of box areas has been instructed and printing of copy number has been specified, then the storage means stores the image data in the common box area.

Further, the printing control apparatus of the present invention is such that the receiving means receives the print job, which includes attribute information relating to maximum allowable number of outputs of the image data, wherein based upon the linking information that has been stored in the plurality of box areas, the output control means outputs the image data, which has been stored in the common box area, within the limit of the maximum number of outputs allowed.

Further, the printing control apparatus of the present invention further comprises deleting means for deleting image data that has been stored in the box area, wherein if the receiving means has received the print job, which includes attribute information relating to automatic deletion of the image data, the deleting means deletes the image data from the box area on the condition that the image data has been output in an amount equivalent to the maximum number of outputs.

Further, according to the present invention, the foregoing object is attained by providing a printing control method for controlling a printing apparatus having a plurality of box areas for storing entered image data and equipped with a box printing function for outputting the image data, which has been stored in the box areas, to a printing unit, comprising: a receiving step of receiving a print job for which a plurality of box areas of the printing control apparatus have been specified; a storage step of storing the image data in a common box area, with which the printing control apparatus is further provided for the purpose of storing common image data, if the print job for which storage in a plurality of box areas has been instructed is received at the receiving step; and a correlating step of correlating the plurality of box areas in which storage has been instructed and the image data, which has been stored in the common box area, using linking information.

Other feature and advantages of the present invention will be apparent from the following description taken in conjunction with the accompanying drawings, in which like references characters designate the same or similar parts throughout the figures thereof.

BRIEF DESCRIPTION OF THE DRAWINGS

The accompanying drawings, which are incorporates in and constitute a part of the specification, illustrate embodiments of the invention and, together with the description, serve to explain the principle of the invention.

FIG. 11 is a diagram illustrating an example of a box setting screen in a printer driver that operates on a personal computer shown in FIG. 1;

FIG. 13 is a diagram illustrating an example of the structure of saved job data transmitted from the personal computer to the image input/output system shown in FIG. 1.

DETAILED DESCRIPTION OF THE PREFERRED EMBODIMENTS

Preferred embodiments of the present invention will now be described in detail with reference to the drawings.

<First Embodiment>

Figure 1:
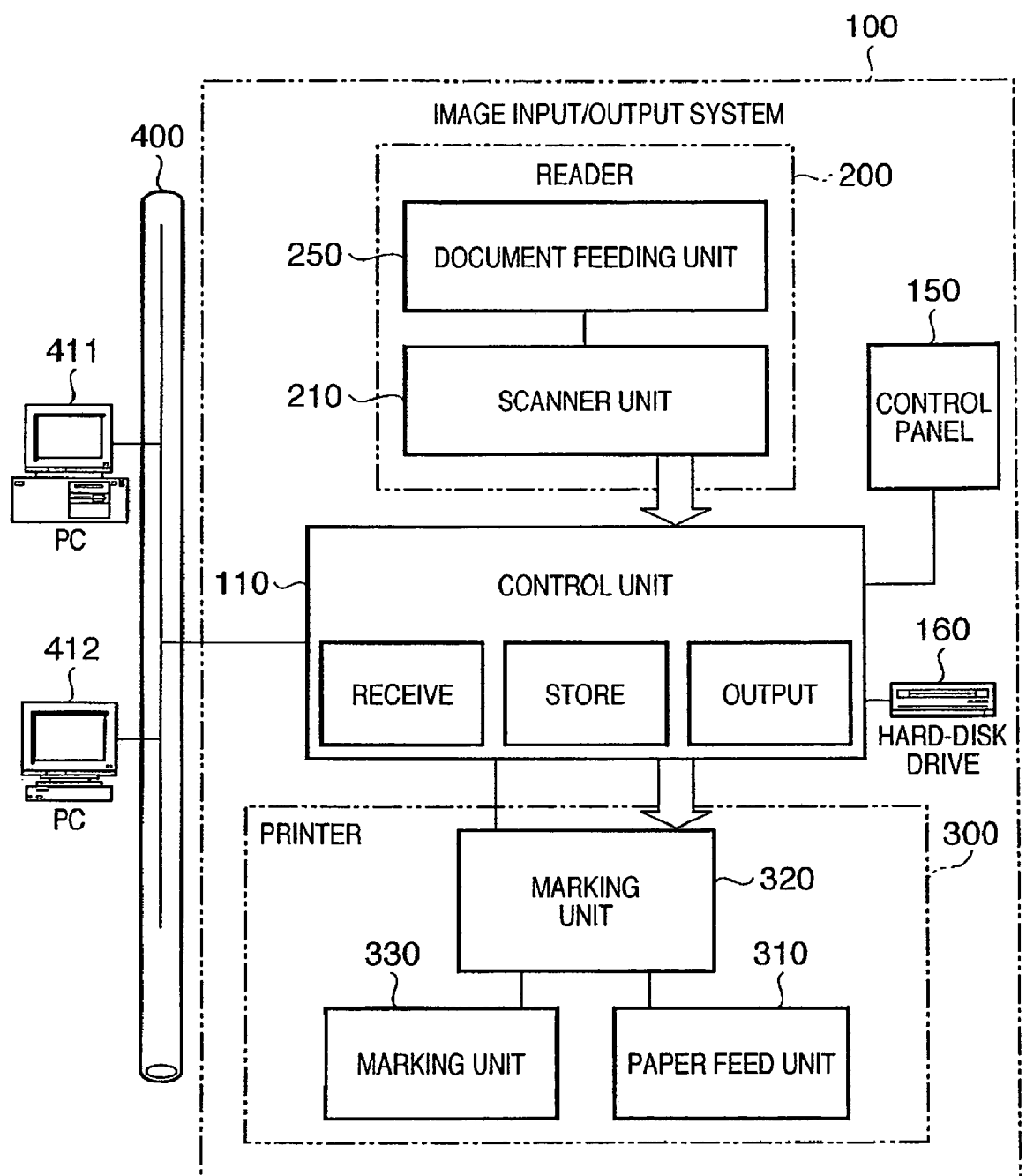
FIG. 1 is a block diagram illustrating the configuration of an image input/output system according to a first embodiment of the present invention.

FIG. 1 is a block diagram illustrating the configuration of an image input/output system according to a first embodiment of the invention. In this embodiment, an apparatus having a copy function, scanner function, printer function, facsimile function and (personal) box function will be described as an example of an image input/output system.

As shown in FIG. 1, an image input/output system 100 has a reader 200, a printer 300, a control unit 110, a control panel 150 and a hard-disk drive 160. The reader 200 includes a document feeder 250 for feeding original documents and a scanner unit 210 for reading images on the original documents fed from the document feeding unit 250. Image data read by the scanner unit 210 is input to the control unit 110.

The printer 300 has a paper feed unit 310, a marking unit 320 and a paper ejecting unit 330. The paper feed unit 310 is equipped with a plurality of cassettes that accommodate printing paper of different sizes and feeds the printing paper from each of the cassettes. The marking unit 320 implements an image forming process that relies upon electrophotography. The marking unit 320 forms an image on recording paper, which has been supplied from the paper feed unit 310, based upon image data that has entered via the control unit 110 from personal computers (host computers) 411, 412 connected to a LAN 400 or from the scanner unit 210. The paper ejecting unit 330 applies processing such as sorting and stapling to printing paper on which an image has been formed by the marking unit 320 and then ejects the printing paper.

The control unit 110 is electrically connected to the reader 200 and printer 300 and is connected to the LAN 400, which accommodates the personal computers 411, 412, and to a public line (not shown). The control unit 110 implements the copy function by exercising control so as to read the image data of an original document by the reader 200, output this image data to the printer 300 and form the image on the printing paper. The control unit 110 implements the scanner function by exercising control so as to convert image data, which has been read by the reader 200, to code data and transmit the code data to the personal computers 411, 412 via the LAN 400.

Furthermore, the control unit 110 implements the printer function by exercising control so as to convert code data, which has been received from the personal computers 411, 412 via the LAN 400, to image data and output this image data to the printer 300. The control unit 110 further implements the facsimile function by reading the image data of an original document using the reader 200 and outputting this image data to a facsimile board (not shown), described later, and by receiving image data, which has been transmitted to the public line, via the facsimile board and outputting this image data to the printer 300.

The hard-disk drive 160 is connected to the control unit 110. The storage area of the hard-disk drive 160 has been divided into a plurality of areas, as described later, and image data is stored in each area. The control unit 110 implements a box function using the hard disk of the hard-disk drive 160. The details of the box function will be described later.

The control panel 150 shown in FIG. 1 has various keys for inputting commands to the control unit 110, and a liquid crystal display panel that displays an interface screen for interfacing the user. In response to operation of a key, the corresponding signal is generated and output to the control unit 110.

Figure 2:
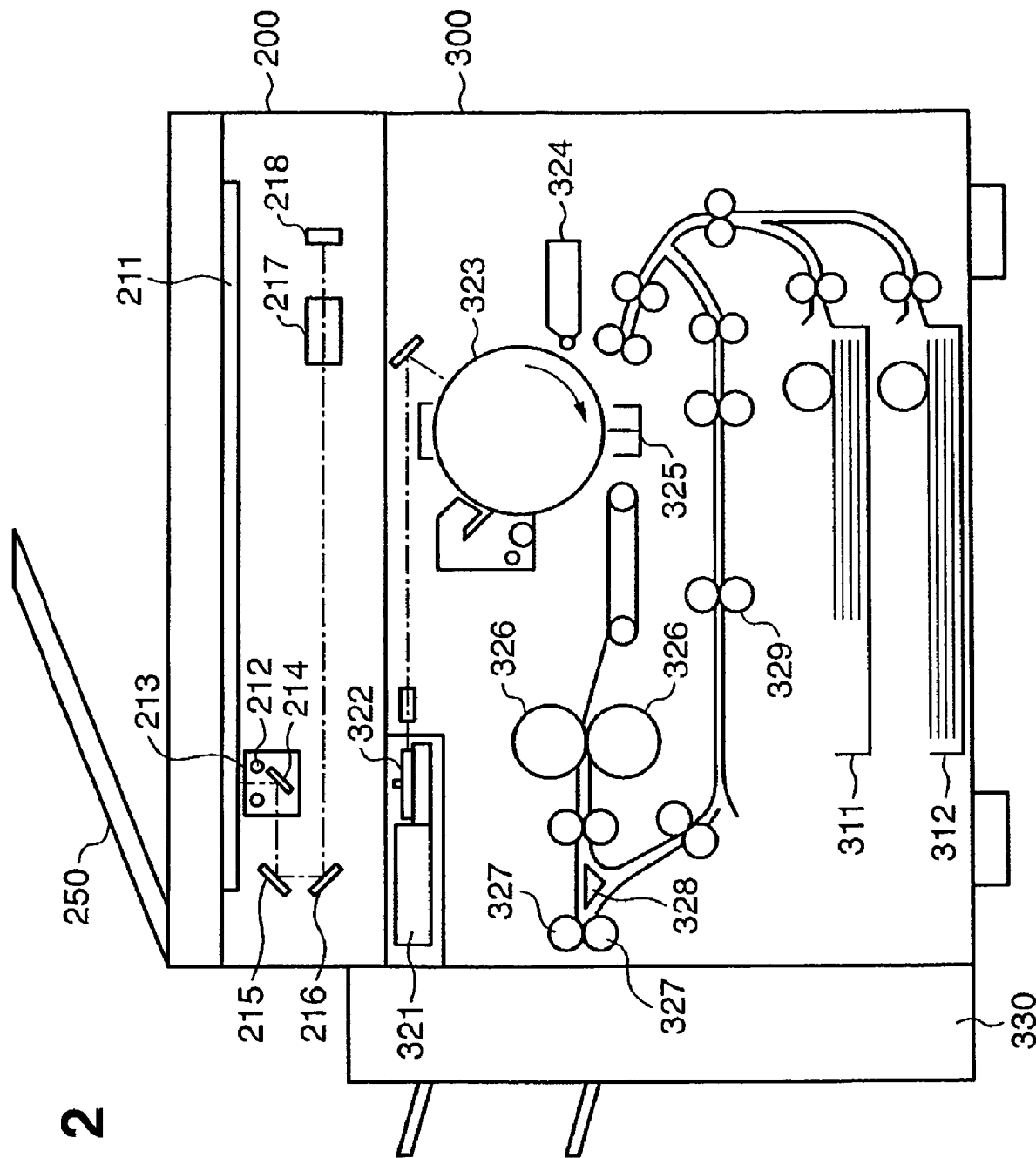
FIG. 2 is a sectional view of a digital multifunction machine implemented by a reader and printer of the image input/output system shown in FIG. 1.

Next, the structures of the reader 200 and printer 300 will be described with reference to FIG. 2. FIG. 2 is a sectional view of a digital multifunction machine implemented by the reader 200 and printer 300 of the image input/output system 100 shown in FIG. 1. As shown in FIG. 2, this embodiment is so adapted that the reader 200 and printer 300 are integrated into a single unit.

The reader 200 has the document feeding unit 250 mounted thereon. The document feeder unit 250 feeds original documents to the top of a platen glass 211 one sheet at a time in order starting from the first sheet and then discharges the documents from the platen glass 211 to a paper-drop tray (not shown) whenever the reading of the documents is completed. When an original document is transported to and placed on the top of the platen glass 211, a lamp 212 of the reader 200 is lit and movement of a moving unit 213 is started. Owing to movement of the moving unit 213, reading and scanning of the original document on the platen glass 211 is performed.

Light reflected from the original document during this reading and scanning is introduced to a CCD image sensor (referred to as a "CCD" below) 218 by mirrors 214, 215, 216 and a lens 217, and the image on the original document is formed on the image sensing surface of the CCD 218. The CCD 218 converts the image that has been formed on the image sensing surface to an electric signal. The electric signal is input to the control unit 110 after it has undergone prescribed processing.

The printer 300 has a laser driver 321. The latter drives a laser emission unit 322 based upon the image data that has entered from the control unit 110. As a result, laser light conforming to the image data is emitted from the laser emission unit 322. A photosensitive drum 323 is irradiated with the laser light while it is scanned across the drum.

An electrostatic latent image is formed on the photosensitive drum 323 by the emitted laser light, and the electrostatic latent image is visualized as a toner image by toner that has been supplied from a developing unit 324. In sync with the timing at which the laser light is emitted, paper from cassettes 311, 312 is fed between the photosensitive drum 323 and a transfer unit 325 along a transport path, and the toner image on the photosensitive drum 323 is transferred to the printing paper fed by the transfer unit 325.

The printing paper to which the toner image has been transferred is fed to a pair of fixing rollers (a heading roller and a pressure roller) 326 via a transport belt. The pair of fixing rollers 326 applies heat to the printing paper and fixes the toner image to the printing paper. Upon passing through the pair of fixing rollers 326, the printing paper is discharged into a discharge unit 330 by a pair of ejection rollers 327.

The discharge unit 330 comprises a sorting processing unit for executing post-processing such as sorting and stable. If a doubled-sided printing mode has been set, the printing paper is transported up to the pair of ejection rollers 327, after which the direction of rotation of the pair of ejection rollers 327 is reversed so that the paper is introduced to a re-feed path 329 by a flapper 328. Printing paper thus reintroduced to the paper re-feed path 329 is fed again to the photosensitive drum 323 and transfer unit 325 at the above-mentioned timing so that a toner image is transferred to the reverse side of the printing paper.

Figure 3:
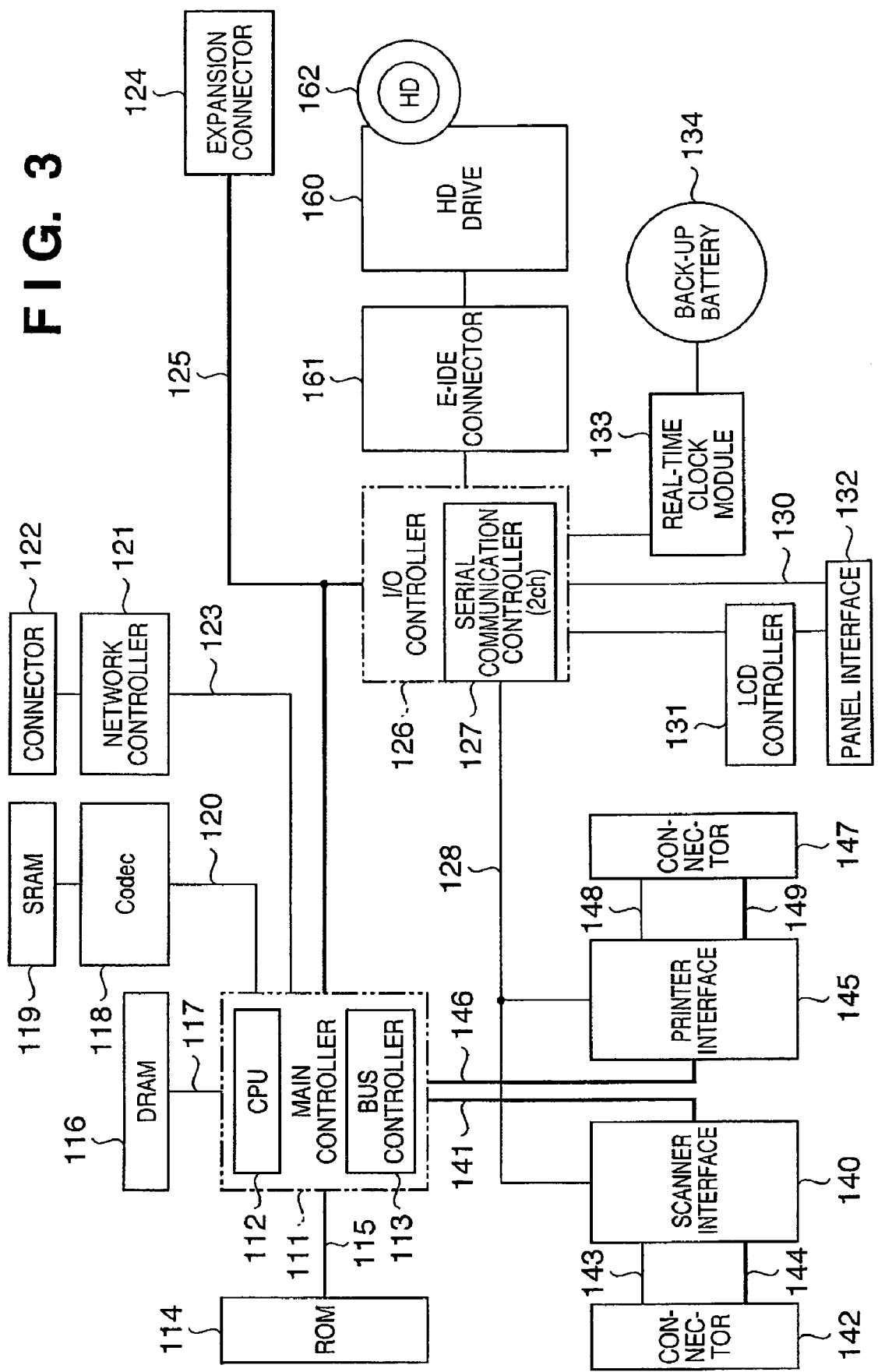
FIG. 3 is a block diagram illustrating the details of structure of a controller in the image input/output system shown in FIG. 1.

The structure of the control unit 110 will now be described in detail while referring to FIG. 3, which is a block diagram illustrating the details of the structure of the control unit 110 in the control unit 110 shown in FIG. 1. As illustrated in FIG. 3, the control unit 110 has a main controller 111 for controlling the overall apparatus. The main controller 111 is provided with a CPU 112, a bus controller 113 and various interface controller circuits (not shown). Further, a ROM 114 is connected to the main controller 111 via an interface 115, and a DRAM 116 is connected to the main controller 111 via an interface 117.

The CPU 112 executes various processing in accordance with a program that has been read in from the ROM 114 via the interface 115. For example, the CPU 112 executes expansion processing, etc., for interpreting PDL (Page Description Language) received from the personal computers 411, 412 and expands this into raster image data. A working area for the CPU 112 is provided by the DRAM 116, in which image data is also stored. Further, control processing, which is executed by the image input/output system 100 and is indicated by flowcharts described later, is implemented by reading out a control program, which has been stored in the ROM 114 or in a hard disk 162, to the DRAM 116 and having the CPU 112 execute processing based upon this control program.

A codec 118 is connected to the main controller 111 via an interface 120. The codec 118 compresses raster-image data, which has been stored in the DRAM 116, by a compression scheme such as MH, MR, MMR or JBIG, etc., and, conversely, expands code data, which has been compressed and stored, to raster-image data. A working area to accompany processing by the codec 118 is provided by an SRAM 119. Data transfer between the codec 118 and DRAM 116 is implemented by a DMA scheme and control thereof is implemented by a bus controller 113.

A network controller 121 is connected to the main controller 111 via an interface 123. The network controller 121 has an Ethernet (registered trademark) or other network function.

The network controller 121 is provided with a connector 122, and the latter is connected to the LAN 400 shown in FIG. 1.

An expansion connector 124 for connecting an expansion board and an input/output controller 126 are connected to the main controller 111 via a general-purpose high-speed bus 125. The latter comprises a PCI bus, by way of example. According to this embodiment, a facsimile board (not shown) is connected to the expansion connector 124 in order to implement the facsimile function, and the facsimile board is connected to the public line.

The input/output controller 126 includes a start-stop synchronization serial communication controller 127 in two channels for sending and receiving control commands to and from the CPUs of the reader 200 and printer 300. The start-stop synchronization serial communication controller 127 is connected to a scanner interface 140 and printer interface 145 via an input/output bus 128.

Further, a panel interface 132 is connected to the input/output controller 126. The panel interface 132 is an interface connected to the control panel 150. An LCD controller 131 is connected to the panel interface 132 and drives a liquid crystal display panel provided on the control panel 150. Further, the panel interface 132 includes an interface 130 for loading key signals that have been input in accordance with operation of hard keys or soft keys on the control panel 150.

A real-time clock module 133 for updating and saving date and time managed within the apparatus and an E-IDE connector 161 are connected to the input/output controller 126. The real-time clock module 133 is backed up by a back-up battery 134. The E-IDE connector 161 is a connector for connecting an external storage device. By connecting an external storage device such as a hard disk or MO drive to the connector 161, image data can be written to and read from the external storage device. According to this embodiment, the hard-disk drive 160 is connected and drives the hard disk 162.

The scanner interface 140 is connected to the main controller 111 by the scanner bus 141. Further, a connector 142 for connection to the reader 200 is provided. The scanner interface 140 and connector 142 are connected via a start-stop synchronization serial interface 143 and video interface 144. The scanner interface 140 has processing functions for subjecting an image received from the reader 200 to optimum binarization and scaling processing, etc. The scanner interface 140 further functions to generate a control signal based upon a video control signal received from the reader 200 and to output this control signal to the main controller 111 via the scanner bus 141. Transfer of data from the scanner bus 141 to the DRAM 116 is controlled by the bus controller 113.

Similarly, the printer interface 145 is connected to the main controller 111 via a printer bus 146. Further, a connector 147 for connection to the printer 300 is provided. The printer interface 145 and connector 147 are connected via a start-stop synchronization serial interface 148 and video interface 149. The printer interface 145 functions to zoom image data that has been output from the main controller 111 to zooming processing and to output the resultant data. The printer interface 145 further functions to generate a control signal based upon a video control signal received from the printer 300 and to output this control signal to the main controller 111 via the printer bus 146. Transfer of raster image data expanded in the DRAM 116 to the printer 300 is controlled by the bus controller 113, and the data is transferred to the printer 300 via the printer bus 146 and video interface 149.

Figure 4:
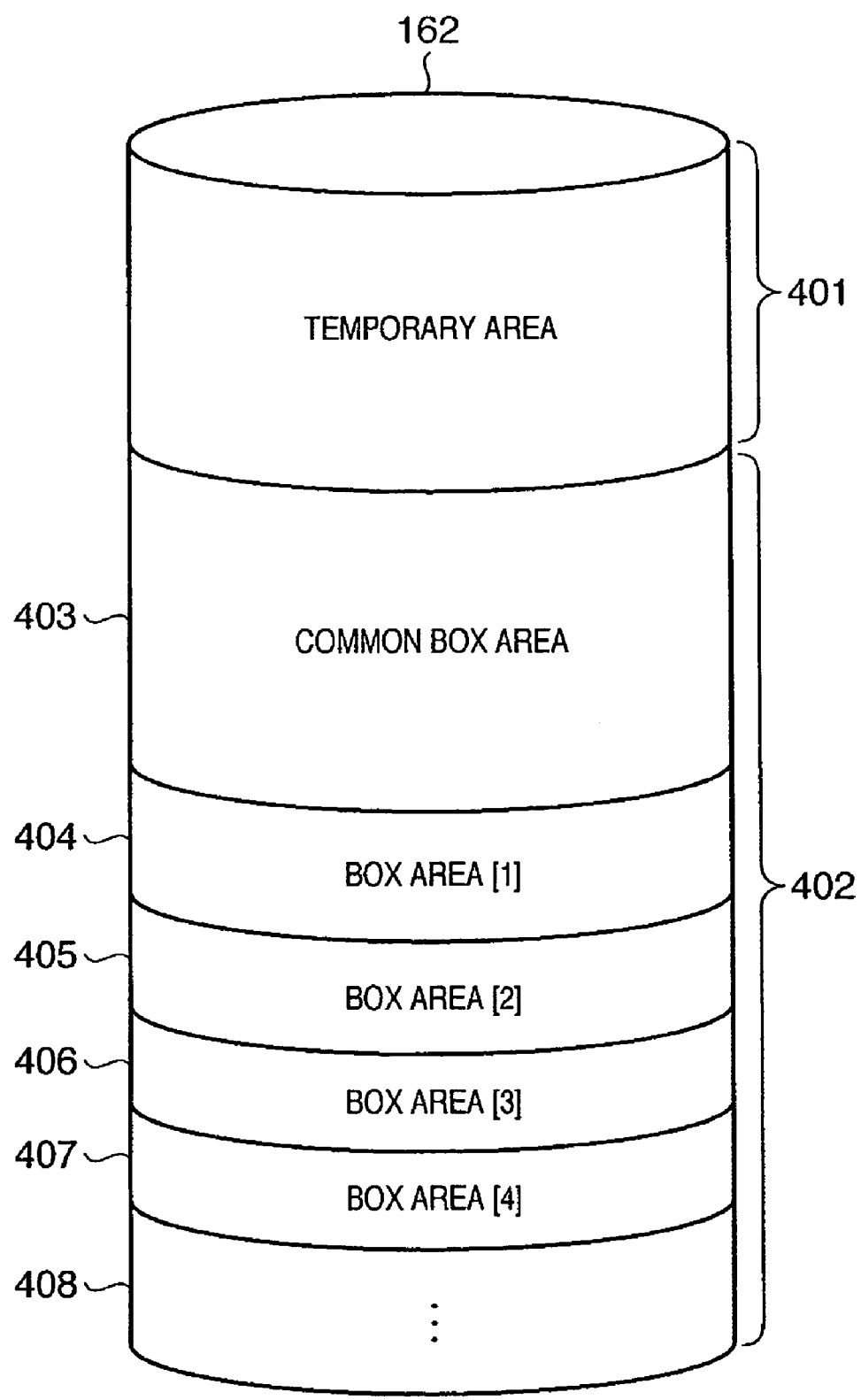
FIG. 4 is a diagram schematically illustrating the storage area of a hard disk in the image input/output system shown in FIG. 1, the storage area having been divided logically into a plurality of areas.

A method of making logical use of the hard disk 162 will now be described with reference to FIG. 4, which is a diagram schematically illustrating the storage area of the hard disk 162 in the image input/output system shown 100 in FIG. 1, the storage area having been divided logically into a plurality of areas. As shown in FIG. 4, the storage area of the hard disk 162 is divided logically into a temporary area 401 and a box area 402.

The temporary area 401 is an area for temporarily storing PDL expansion data and image data from the scanner unit 210 in order to change the order in which image data is output and make possible output by a single scan in a multiple-copy output. On the other hand, the box area 402 is an area used in a box function and has been divided into a predetermined number of areas. In this embodiment, it is assumed that the box area 402 has been divided into areas 403 to 408. The area 403 is a common box area. The areas 404 to 408 usually are assigned on a per-user or per-post basis. Each of the areas 404 to 407 has been assigned a corresponding box number, box name and password. By designating a box number, the user can access the area corresponding to this box number. By entering a password, the image data of the corresponding area can be read out and it is possible to print out and transmit the image data.

The function whereby a user can designate an area in the box area 402 of the hard disk 162, store image data in the designated area, read out this image data at any timing by performing an operation, print out the data and transmit it by facsimile, etc., is referred to as a "box function".

In this embodiment, first the common box area 403 is assigned as part of the box area 402. When the same data is to be stored in a plurality of boxes, the main body of the data is stored in the common box area 403 and a linking structure from an individual box area 404, etc., is produced, thereby reducing the overall size of the data. Further, only an administrator is furnished with the privilege to access the common box area, and a record that a copy-number output has been performed is left behind in the form of a log file, thereby making it possible to trace an output file.

Box functions are classified into three functions, namely functions for box registration, box print and box transmit. Box registration is a function for designating a corresponding area (common box area 403 or box areas 404 to 408) in the box area 402 from the personal computers 411, 412 or from the reader 200, and storing image data (PDL expansion data or image data that has been read by the scanner unit 210) in this designated area.

Further, box print is a function for designating an area in the box area 402, reading image data (PDL expansion data or image data that has been read by the scanner unit 210) out of this designated area, transmitting the data to the printer 300 and printing out the data.

Furthermore, box transmit is a function for designating a plurality of areas (the common box area 403 or box areas 404 to 408) in the box area 402, reading image data (PDL expansion data or image data that has been read by the scanner unit 210) out of the designated area, and transmitting the image data to the personal computers 411, 412 via the LAN 400 or transmitting the image data by facsimile transmission, Internet facsimile transmission, E-mail attachment or remote-copy transmission, etc.

Next, box registration of the box function will be described with reference to FIG. 5, which is a flowchart for describing the procedure of box registration processing in the image input/output system 100 shown in FIG. 1. Described here will be a case where PDL data that has been transmitted from the personal computer 411 is stored in a designated area in the box area 402 on the hard disk 162 of the control unit 110.

Figure 5:
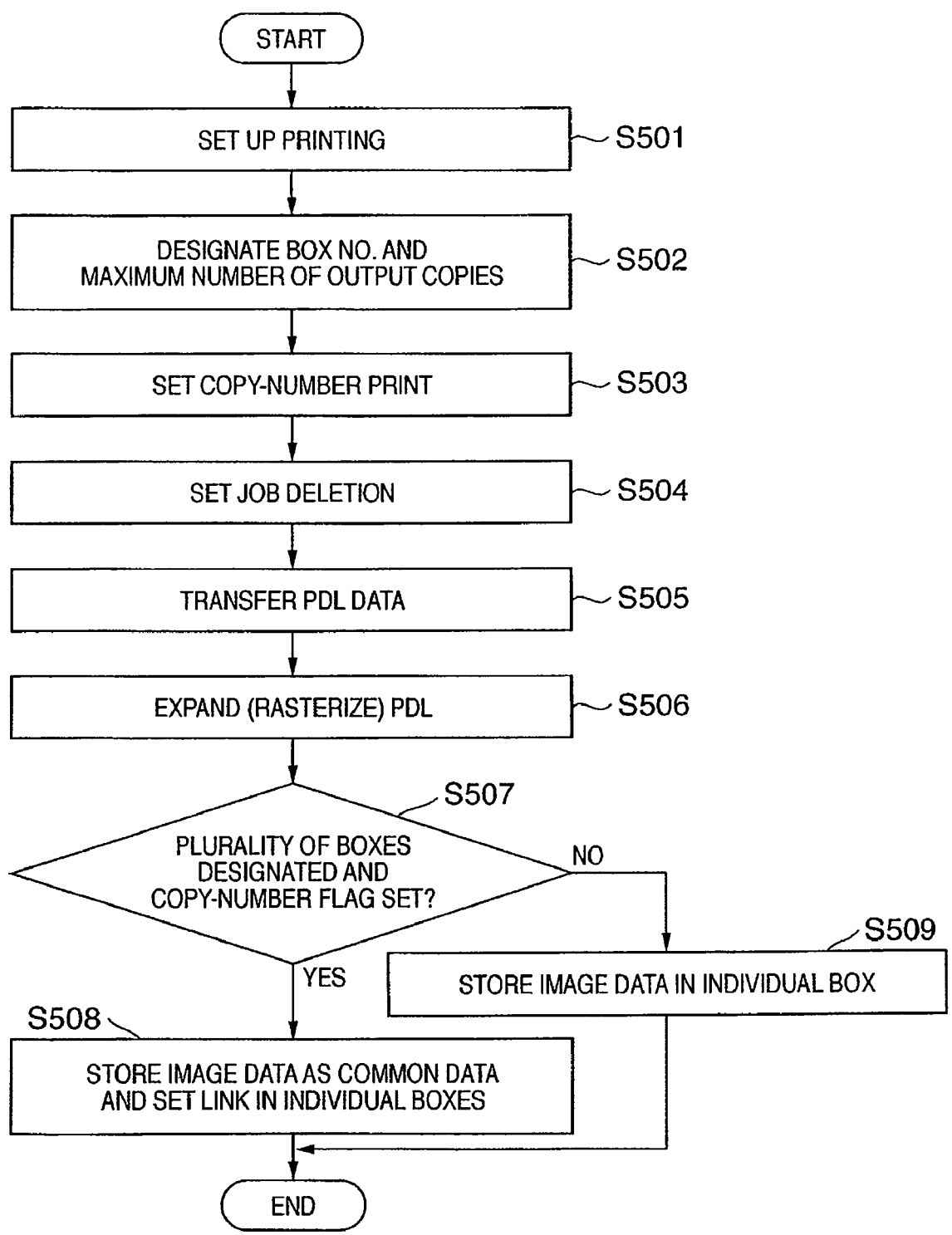
FIG. 5 is a flowchart for describing the procedure of box registration processing in the image input/output system shown in FIG. 1.

In box registration, as shown in FIG. 5, first the user performs an operation at the personal computer 411 to set printing via a printing-setup user interface of the printer driver (step S501). In print setup, the following items can be set: number of copies, paper size, enlargement/reduction rate, single/double side, page output sequence, sorted output and whether or not staple processing is to be performed. At this time it is also possible to set copy-number printing via the user interface of a printer driver, described later with reference to FIG. 11.

Next, using the personal computer 411, the user enters one or a plurality of box numbers and designates a plurality of areas (box areas 404 to 408) in the box area 402 of the hard disk 162 (step S502). For example, if Box. No. 1 is input by the user, the box area 404 in box area 402 is designated as the area corresponding to Box No. 1. At this time it is possible to set the maximum number of copies for which output is allowed with respect to each designated box (a default setting makes it possible to print any number of copies).

Next, a copy-number print setting for printing on output paper the number of copies output thus far is performed (step S503). A job-deletion condition setting is then made (step S504), after which PDL data is transferred via the LAN 400 to the control unit 110 of the image input/output system 100 (step S505). More specifically, if a print command is applied using the personal computer 411, the printer driver that has been installed in the personal computer 411 responds to this print command by converting code data, which is to be printed, to PDL data. The PDL data is transferred to the control unit 110 together with the print setting parameters that have been set at steps S501 to S504. The control unit 110 has a receiving section serving as receiving means for thus receiving a print job.

Next, the PDL data that has been transferred by the control unit 110 is expanded (rasterized) into image data (step S506). Next, reference is had to the print settings of the PDL data and it is determined whether an area 1602 of number of designated boxes (see FIG. 13) specifies a plurality of boxes and whether a copy-number flag 1609 has been set (i.e., whether the flag is logical "1") (step S507). If it is determined that a plurality of boxes have been designated and that this is a print job in which copy-number printing is to be performed ("YES" at step S507), then data information (linking information linking to the rasterized image data) is set and stored in the designated box areas in the box area 402 of the hard disk 162, and the rasterized image data is stored in the common box area 403 as common image data (step S508). If it is determined that a single box has been designated, then the image data is stored in the designated box area (step S509). Thus, the control unit 110 has a storage section serving as storage means for thus storing image data on the hard disk 162.

By way of example, when solely the box area 404 in the box area 402 has been designated by the Box. No. "1", the image data is stored in box area 404. When box areas 404 and 406 in the box area 402 have been designated by Box Nos. "1" and "3", the data information is stored in box areas 404 and 406 and the common image data is stored in the common box area 403.

FIG. 11 is a diagram illustrating an example of a box setting screen in the printer driver that operates on the personal computer 411 shown in FIG. 1. As shown in FIG. 11, in area 141 the user can set the name of data to be stored, in area 142 the user can designated by mouse the box number or numbers in which data is to be stored, and in area 143 the user can enter, on a per-box basis, the number of copies allowed for output. Furthermore, if copy-number printing is to be performed, a check can be placed in a check box 144 and in a check box 145, which is for specifying automatic deletion of data.

Reference will be had to FIG. 13 to describe the structure of PDL data generated by the printer driver when the above-mentioned boxes have been designated and a copy-number print setting has been made. FIG. 13 is a diagram showing an example of the structure of saved job data transmitted from the personal computer 411 to the image input/output system 100.

As shown in FIG. 13, job-type information 1601 is set at the beginning of data and is indicative of box storage or ordinary printing. In case of a job in which use of a box is possible, the number of boxes in which data is to be stored (the number of designated boxes) 1602 is followed by storage of a pair of items, namely Box. No. 1603 and number 1604 of output copies allowed, the number of these pairs being equivalent to the set number of boxes. That is, in the example of FIG. 13, two pairs have been stored, namely Box No. 1603 and number 1604 of output copies allowed, and Box No. 1605 and number 1606 of output copies allowed.

Furthermore, information such as a stored-file name 1607, user name 1608, copy-number flag 1609, password 1610 and deletion flag 1611 also is set from the above-mentioned various set values and log-in information. The copy-number flag 1609 is a flag indicating whether copy-number print is to be performed. In a case where execution of copy-number print has been set via the user interface of the printer driver of FIG. 11, the copy-number flag 1609 is "1"; if this setting has not been made, then the copy-number flag 1609 is "0". These items of header information are followed by a print-data section 1612. It should be noted that when there is no limit on the number of output copies, a value indicating that there is no limit is set in the numbers 1604, 1606 of output copies allowed.

Figure 12:
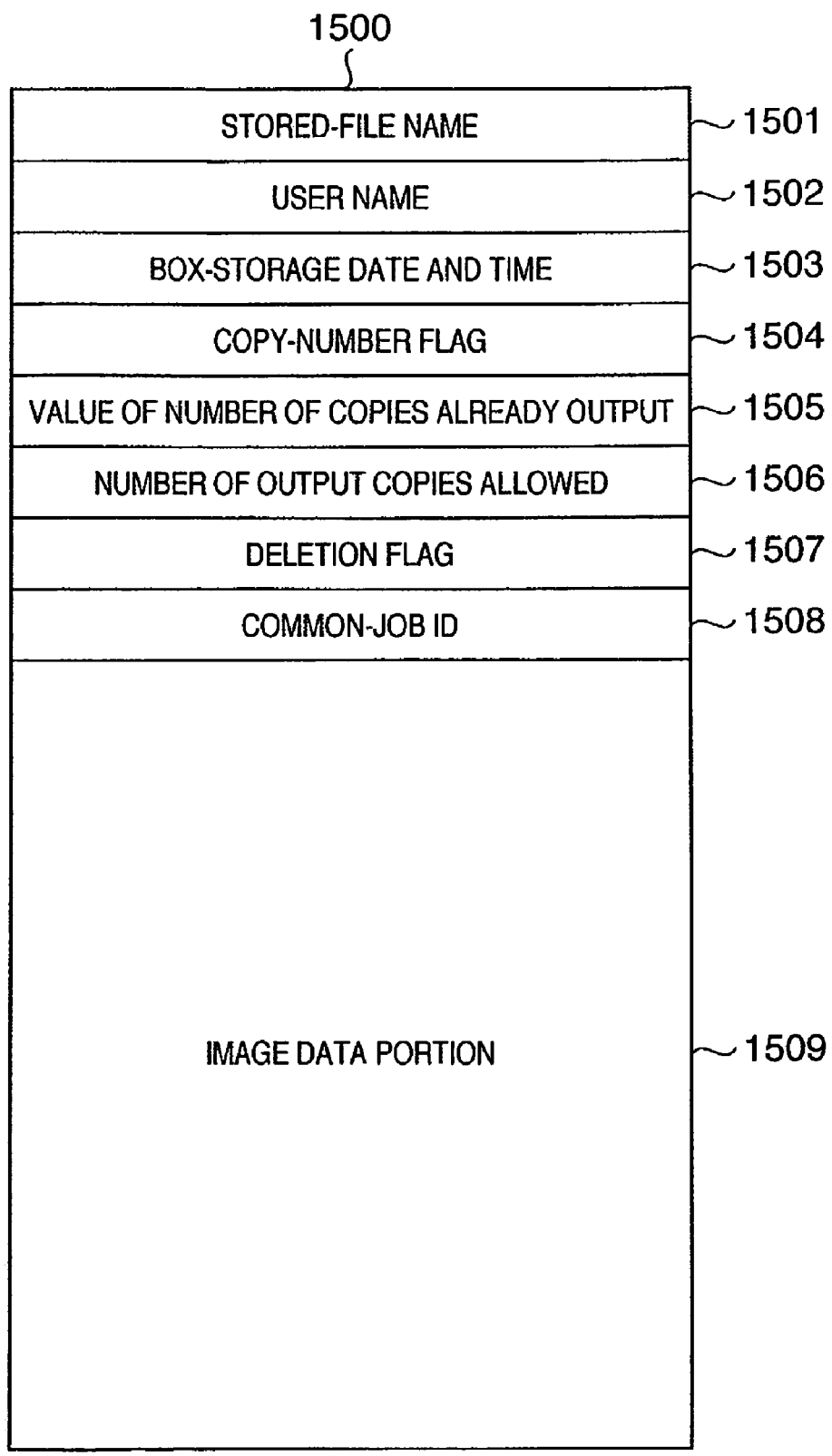
FIG. 12 is a diagram illustrating an example of the structure of saved data that is saved in the image input/output system shown in FIG. 1.

Next, reference will be had to FIG. 12 to describe the data structure of a file when rasterized image data from a saved job is stored in an area designated in the box area 402 of hard disk 162 at step S507 shown in FIG. 5. FIG. 12 is a diagram showing an example of the structure of saved data that is saved in the image input/output system 100 shown in FIG. 1. As shown in FIG. 12, storage data 1500 is composed of a stored-file name 1501; a user name 1502 of the user who registered the data; box-storage date and time 1503; a copy-number flag 1504 specifying whether copy-number print is ON or OFF; a value 1505 (initial value=0) indicating number of copies already output; an allowable-output copy number 1506, which is the number of copies of this data that can be output; a deletion flag 1507 indicating automatic file deletion after output of the number of allowed copies; a common-job ID 1508 indicating common data to be registered in the common box area 403 when data is stored in a plurality of boxes; and an image-data section 1509 of the body of image data rasterized.

When one box is designated and data stored, the stored-file name 1501, user name 1502, box-storage date and time 1503, copy-number flag 1504, allowable-output copy number 1506 and deletion flag 1507 are set from the information of the stored job. Further, the rasterized image data is stored in the image-data section 1509 without registering anything in the common-job ID 1508. The value 1505 of number of copies already output is set in an area that stores the number of output copies of this file. The initial value thereof is set to zero and the value is updated whenever a copy is output.

When image data is stored in a plurality of boxes, the storage data 1500 shown in FIG. 12 is created in the common box area 403. Similarly, when storage of data in a single box is registered, the setting is made from the value of the stored job data but the issued ID is set in the file name. Further, the allowable-output copy number 1506 sets the total value when an allowable-output copy number has been set for every box. If there is even one box that has been set to "FREE" (no limit), then "FREE" is set. In a plurality of designated box areas, storage data 1500 having no data portion is generated and the ID of the generated data that has been created in the common box area 403 is set as a common-job ID value.

The procedure described above is a procedure in a case where PDL data that has been transmitted from the personal computer 411 is stored in a designated area within the box area of hard disk 162. However, a similar procedure is used in a case where image data that has been read by the reader 200 is stored in a designated area within the box area of hard disk 162. In this case, a scanning setting such as image processing is made instead of the print setting at step S501, and the image data that has been read by the reader 200 can be stored in the designated area within the box area 402 by issuing a scanning-start command from the control panel 150 after a box number has been designated in a manner similar to that of step S502.

Further, by designating a box number, data can be stored in the corresponding area within the box area 402 in a manner similar to that when an image that has been distributed remotely from another device on the LAN 400 is registered. Thus, with regard also to the two examples set forth above, data can be stored in similar fashion by turning on the copy-number setting and storing the data at the time of box storage.

Figure 6A:
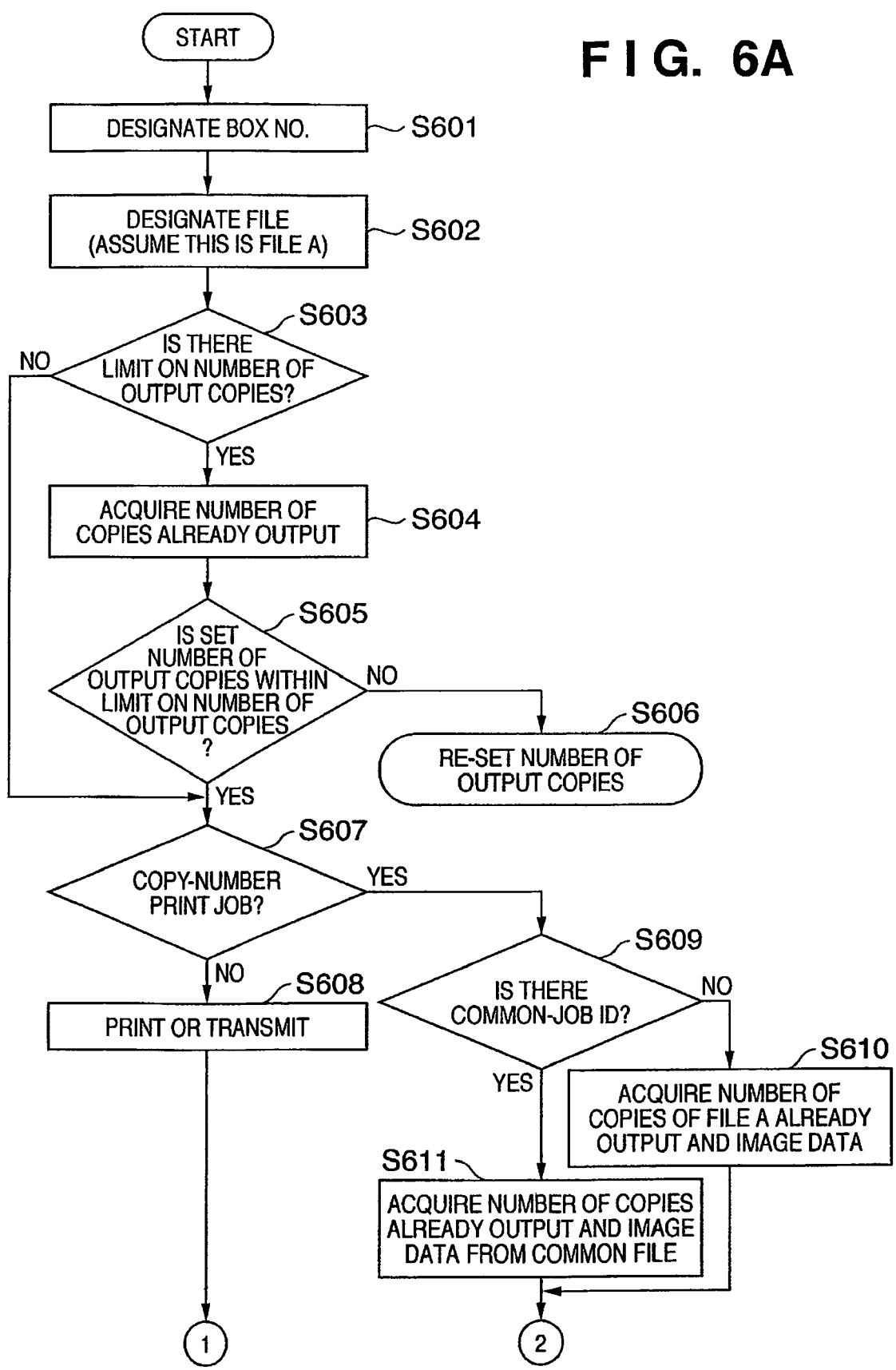
FIGS. 6A and 6B are flowcharts for describing the procedure of box printing and box transmission in the image input/output system shown in FIG. 1.
Figure 6B:
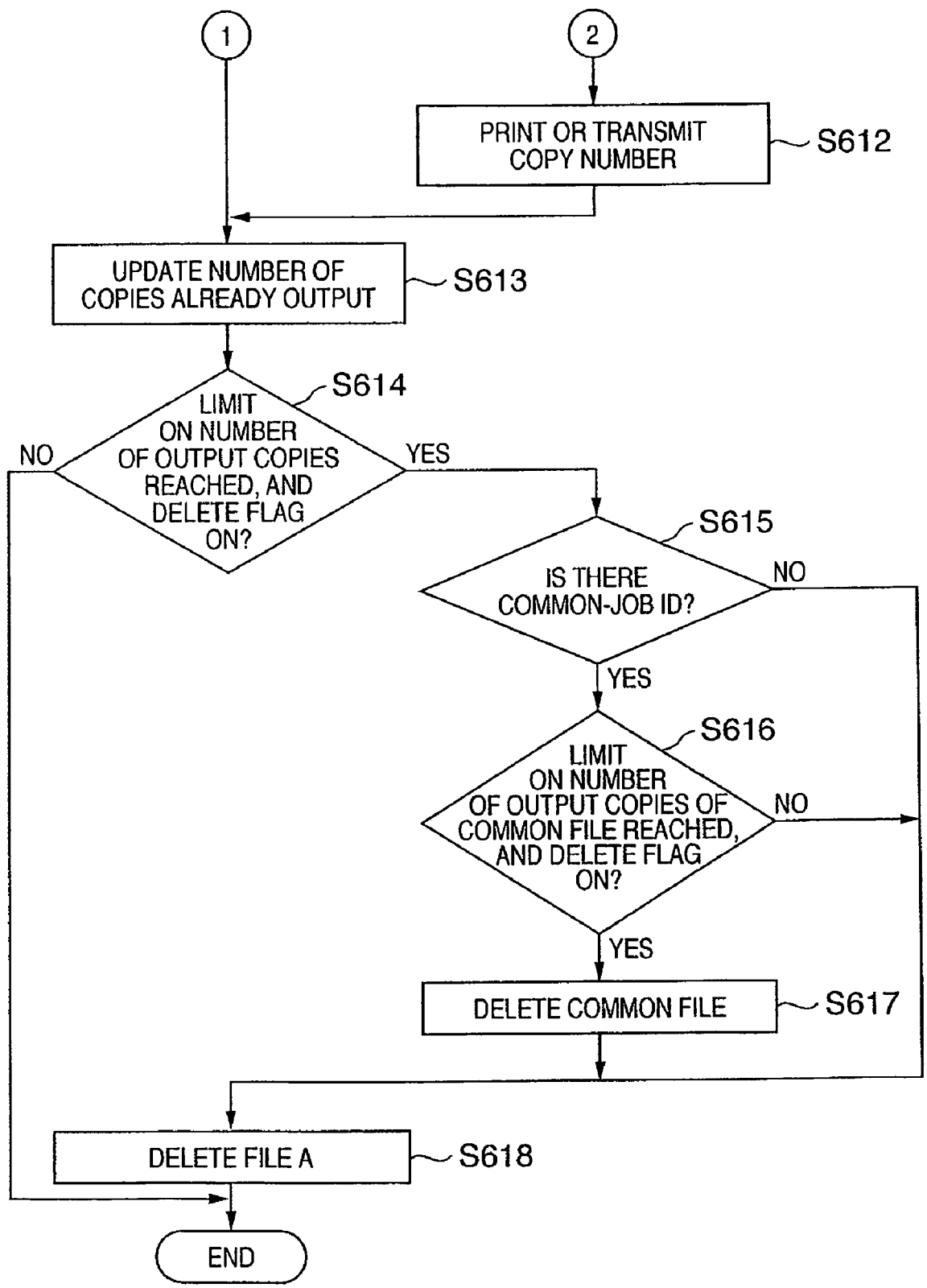
Figure 7:
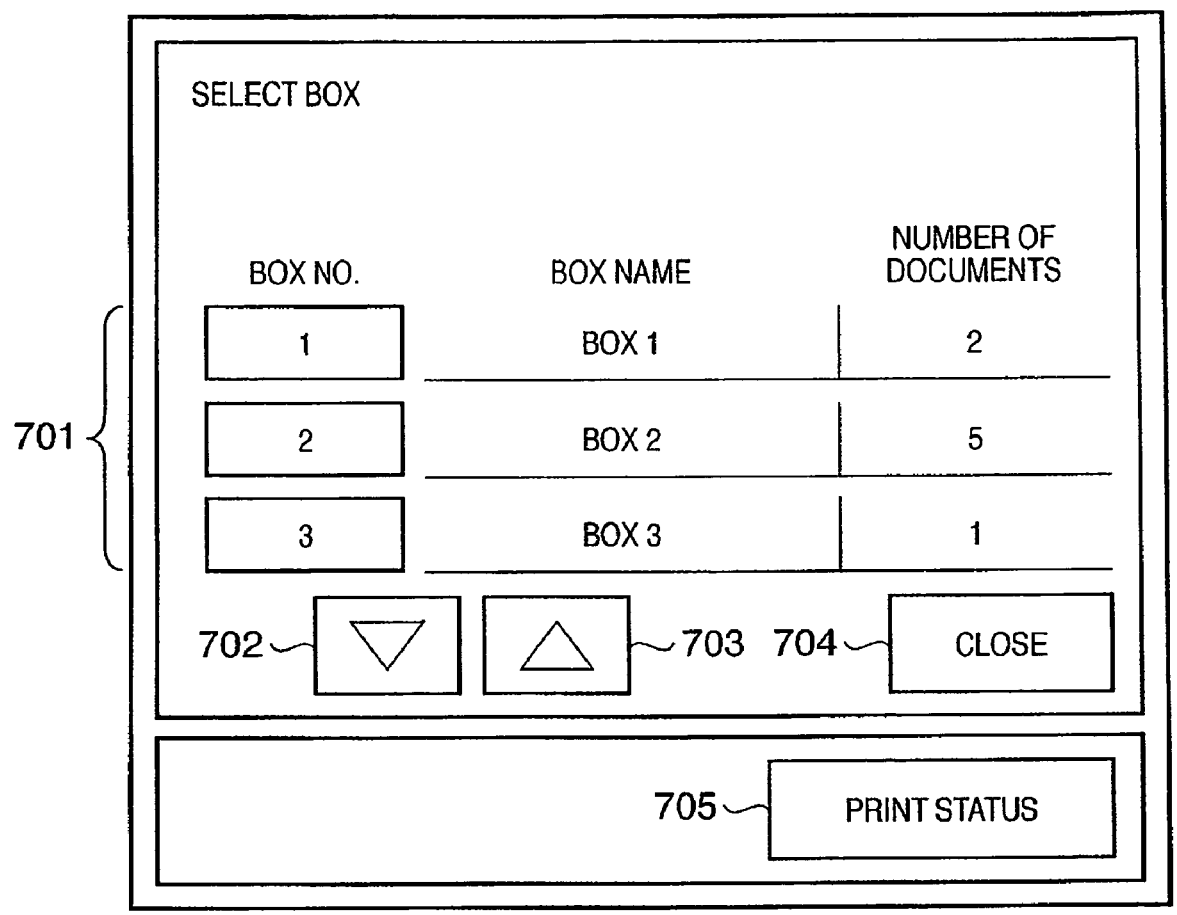
FIG. 7 is a diagram illustrating an example of a box-area selection screen displayed on a control panel in a case where box printing and box transmission are performed in the image input/output system shown in FIG. 1.
Figure 8:
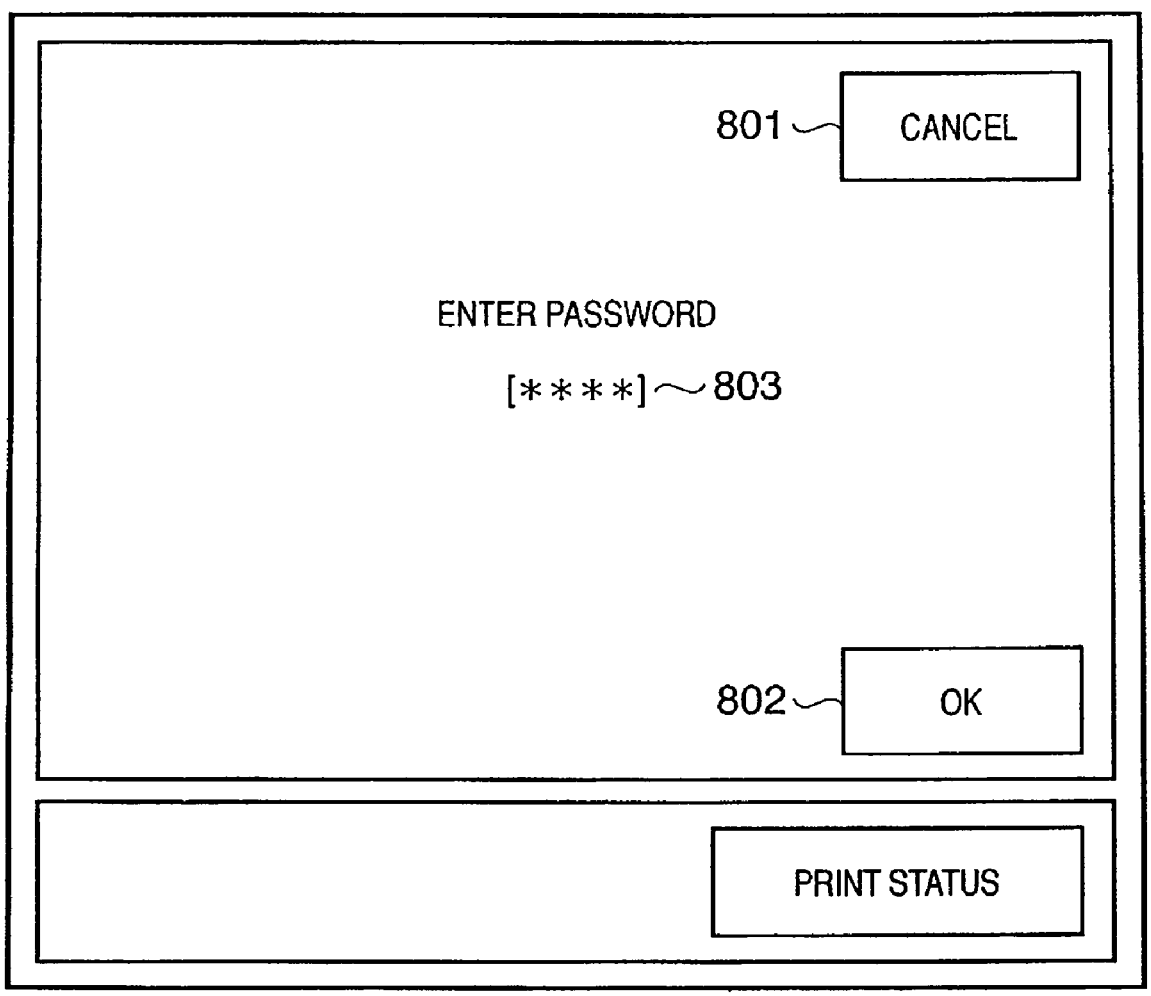
FIG. 8 is a diagram illustrating an example of a password input screen displayed on the control panel in a case where box printing and box transmission are performed in the image input/output system shown in FIG. 1.
Figure 9:
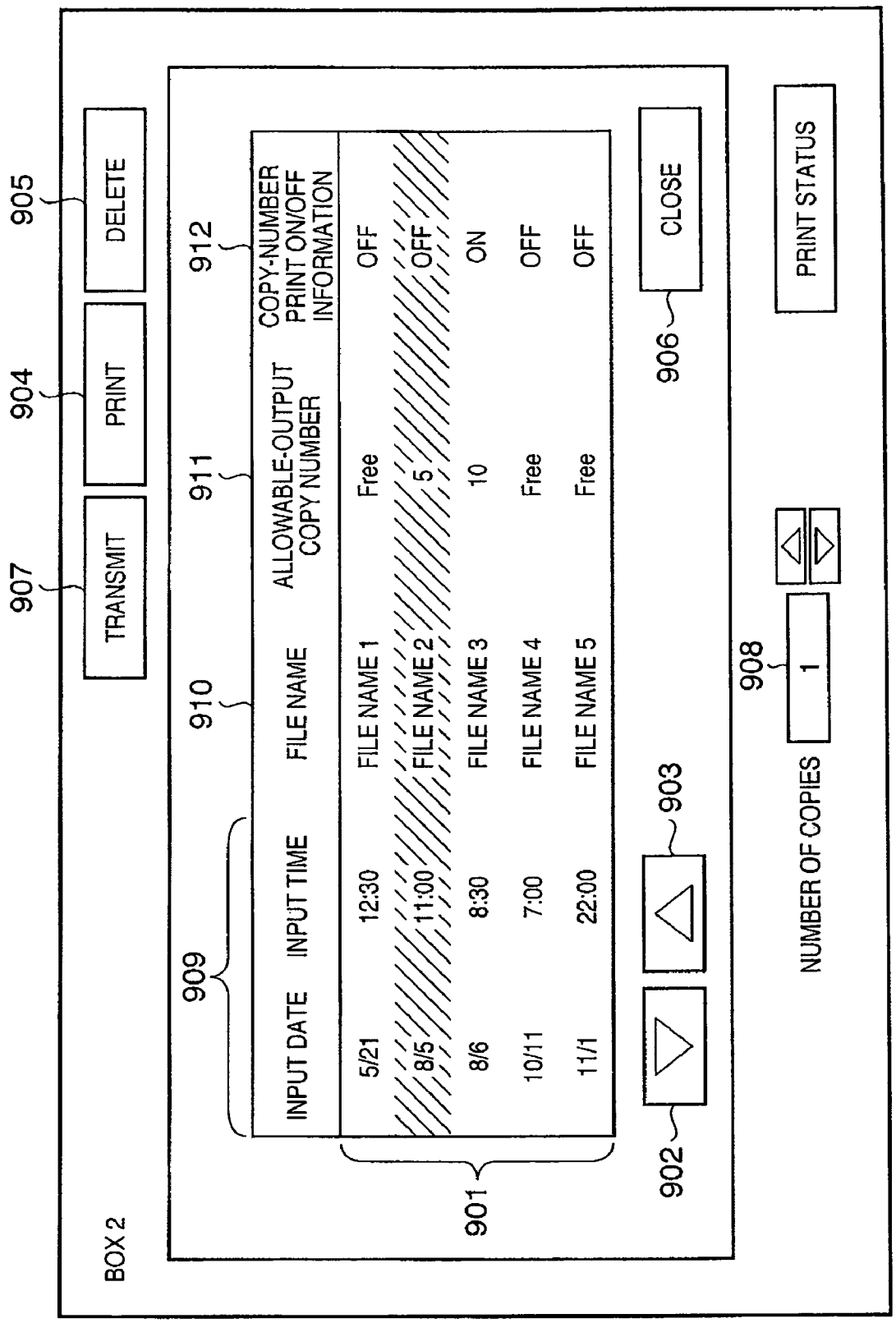
FIG. 9 is a diagram illustrating an example of a document selection screen displayed on the control panel in a case where box printing and box transmission are performed in the image input/output system shown in FIG. 1.
Figure 10:
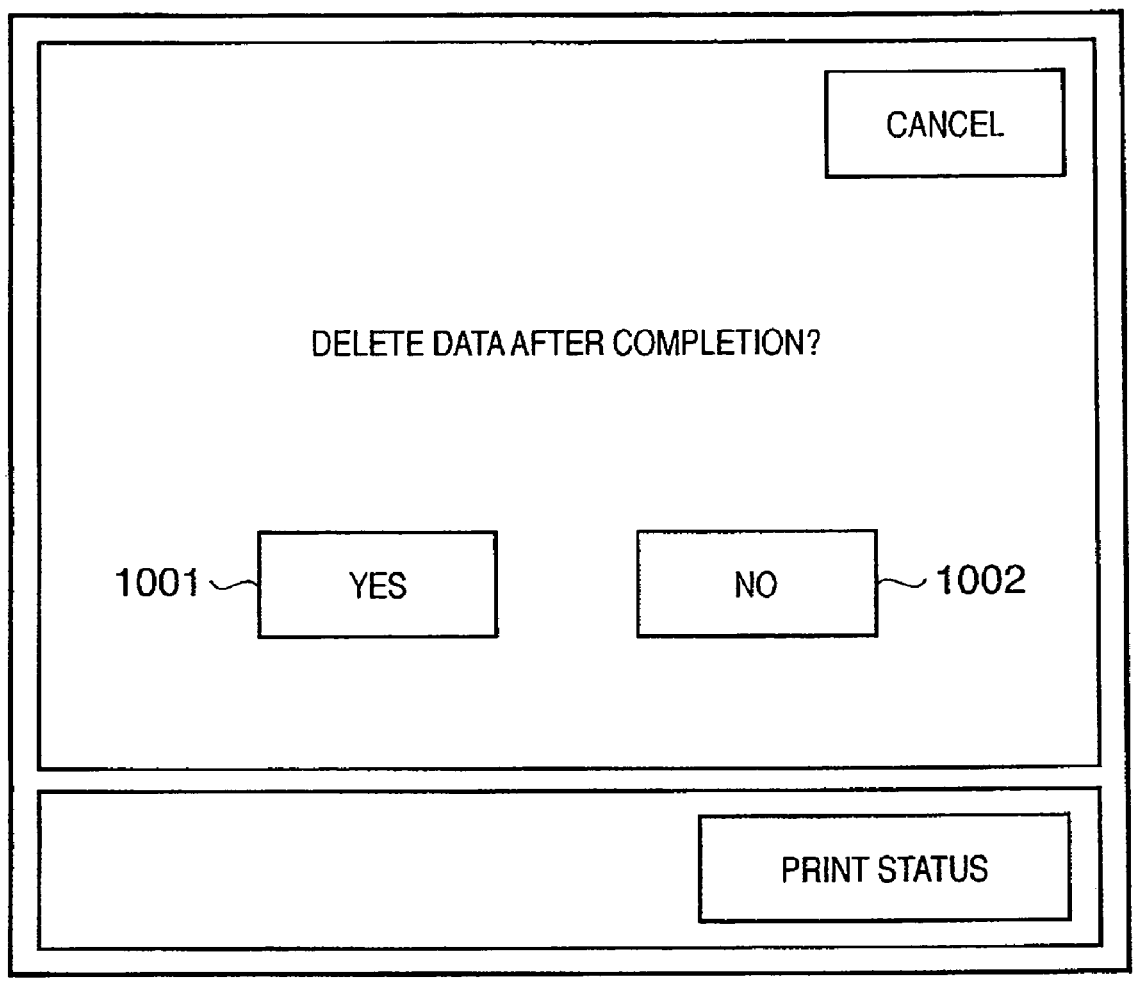
FIG. 10 is a diagram illustrating an example of a document deletion setting screen displayed on the control panel in a case where box printing and box transmission are performed in the image input/output system shown in FIG. 1.

Reference will be had to FIGS. 6 to 10 to describe box print and box transmit based upon the box function. First, FIGS. 6A and 6B are flowcharts for describing the procedure of box print and box transmit in the image input/output system 100 shown in FIG. 1. Further, FIG. 7 is a diagram illustrating an example of a box-area selection screen displayed on the control panel 150 in a case where box print and box transmit are performed in the image input/output system 100 shown in FIG. 1. Furthermore, FIG. 8 is a diagram illustrating an example of a password input screen displayed on the control panel 150 in a case where box print and box transmit are performed in the image input/output system 100 shown in FIG. 1, FIG. 9 is a diagram illustrating an example of a document selection screen displayed on the control panel 150 in a case where box print and box transmit are performed in the image input/output 100 system shown in FIG. 1, and FIG. 10 is a diagram illustrating an example of a document deletion setting screen displayed on the control panel 150 in a case where box print and box transmit are performed in the image input/output system 100 shown in FIG. 1.

First, in a case where box print and box transmit are performed, a box number is designated from the control panel 150 in order to access an area within the box area 402 of hard disk 162 on which image data has been stored (step S601), as indicated in the flowcharts of FIGS. 6A and 6B. For example, a box key on the control panel 150 is pressed in the operation for designating this box number. In response to depression of this box key, the box-area selection screen illustrated in FIG. 7 is displayed on the touch-sensitive panel of the control panel 150. Displayed on this box-area selection screen are information 701 regarding the box areas 404 to 408 (the common box area 403 is not included) in the box area 402 of hard disk 162; up/down cursor keys 702, 703 for scrolling the screen up and down; a key 704 for closing this screen and restoring a standard screen (an initial screen); and a print-status key 705 for viewing the print status of the operation currently being performed.

The information regarding the box areas 404 to 408 include box-number keys, box names and stored-document numbers appended to respective ones of the box areas 404 to 408. For example, if the user is to enter "1" as the box number, then the box number "1" can be input by pressing the "1" box-number key.

If a box number for designating an area in the box area 402 is input on the box-area selection screen shown in FIG. 7, the password input screen shown in FIG. 8 is displayed. Displayed on the password input screen are a password input field ("****" in FIG. 8) 803; a cancel key 801 for cancelling a password input; and an OK key 802 for finalizing an entered password. If the cancel key 801 is pressed, the box-area selection screen shown in FIG. 7 is restored.

The input of a password on the password input screen is performed by operating numeric keys on the control panel 150. A password that has been input by operating the numeric keys is displayed in the form of asterisks "****" so as not to be recognizable by another person. If the OK key 802 is pressed following input of the password, the password thus input will be sent from the control panel 150 to the control unit 110. The latter determines whether the input password is correct or incorrect. When the password is incorrect, the fact that the input password is incorrect is displayed and the above-described password input screen is restored.

When the input password is correct, the document selection screen shown in FIG. 9, for example, is displayed on the touch-sensitive panel of the control panel 150 and a file within the area corresponding to the designated box number is designated (step S602). The document selection screen shown in FIG. 9 is a screen for selecting files in the area of Box No. 2.

Displayed on the document selection screen shown in FIG. 9 are information 901 for each file in the designated area; up/down cursor keys 902, 903 for scrolling the information 901 up and down; a print key 904 for setting box print to print out a file that has been selected on this screen; an erase key 905 for erasing a selected file without printing or transmitting the file; a key 906 for closing the present screen and restoring the box-area selection screen shown in FIG. 7; and a transmit key 907 for setting box transmit to transmit the file selected on the present screen.

The information 901 for each file in the designated area includes input date and time 909, file name 910, allowable-output copy number 911 and copy-number print on/off information 912, these being stored for each file. If a display area of a file selected by the user is pressed by the user, the file is displayed in highlight and the fact that this file has been selected is represented by the highlight display (e.g., the file is that entered on August $5^{th}$).

It is possible for the selection of this file to be performed by pressing the display area of another file. For example, when a file that has been selected is to be erased without being printed or transmitted, the erase key 905 is pressed. Further, in a case where box print is to be selected, the print key 904 is pressed. Furthermore, if box transmit is to be selected, then the transmit key 907 is pressed. If the transmit key 907 is pressed, the screen shifts to a screen (not shown) for selecting a transmit mode for box transmit, the user selects the transmission mode, such as transmission to the personal computers 411, 412, facsimile transmission, Internet facsimile transmission, transmission by attachment to E-mail and remote-copy transmission, and a setting that is necessary for the selected transmission mode is performed.

When the selected file is to be erased without printing or transmitting the file, the erase key 905 is pressed and the selected file is erased. It should be noted that when box print or box transmit is selected, the document deletion setting screen shown in FIG. 10 is displayed on the touch-sensitive panel of the control panel 150. The document deletion setting screen is a screen for selecting whether or not to erase the selected file after the selected file is printed out or transmitted. A "YES" key 1001 and a "NO" key 1002 are displayed on this screen. If the "YES" key 1001 is pressed, then erasure of the selected file after printing or transmission of the file is set. On the other hand, if the "NO" key 1002 is pressed, then erasure of the selected file after printout or transmission of the file is not set.

When selection of a file, selection of box print or box transmit and the setting for file erasure after printing or transmission have been performed, control proceeds to the next step. Files will be defined as follows: Let "File A" be a file that the user has selected at step S602, and if File A is a file that has been stored upon designating a plurality of boxes, then let "common file" represent stored data that has been stored in the common box area indicated by the common-job ID.

With reference again to FIGS. 6A and 6B, a limit on number of output copies of the selected File A is checked (step S603). If the result is that the number of output copies is limited ("YES" at step S603), then the number of copies already output (value 1505 indicating umber of copies already output) is acquired (step S604) and control proceeds to step S605. On the other hand, if there is no limit on number of output copies ("NO" at step S603), then control proceeds to step S607.

It is determined at step S605 whether the set number of output copies is within the limit on number of copies allowed. If the result of the determination is that it is within the limit on number of copies allowed ("YES" at step S605), then control proceeds to step S607. If it exceeds the limit ("NO" at step S605), on the other hand, the number of output copies is set again using the box 908 for setting the number of output copies (S606).

It is determined at step S607 whether copy-number print has been set for the designated File A. If the result of the determination is that copy-number print has been set for the designated File A ("YES" at step S607), then control proceeds to step S609. On the other hand, if copy-number print has not been set for the designated File A ("NO" at step S607), then control proceeds to step S608.

If the selected File A is to undergo box print at step S608, then, when an ID has been entered as the common-job ID of File A, the image data of the common file indicated by the ID in the common box area 403 is read out and transferred to the printer 300, which proceeds to print out the image data. Further, through a method similar to that when box print is performed, the image file of the common file is read out and the file is transmitted to the destination in the selected transmission mode. On the other hand, if an ID has not been entered as a common-job ID of File A, the image data of File A is read out and transferred to the printer 300, which proceeds to print out the image data. Further, in a manner similar to that when box transmit is performed, the image file of File A is read out and transmitted to the destination in the selected transmission mode. Control then proceeds to step S613.

When copy-number print has been set, it is determined whether an ID has been entered as a common-job ID of stored data (step S609). If the result of the determination is that an ID exists ("YES" at step S609), i.e., in case of a job in which a plurality of boxes have been registered, control proceeds to step S611. This step calls for acquisition of the value 1505 indicating number of copies already output of the common file 1500 in the common box area 403 indicated by the value of the common-job ID, adopts a value obtained by incrementing this value as the copy-number print number and also acquires the image data 1509 of the common file indicated by the ID in the common box area 403. Control then proceeds to step S612.

On the other hand, if a common-job ID value does not exist in File A ("NO" at step S609), i.e., in case of a job in which a single box is registered, the value 1505 indicating number of copies already output of File A is acquired, a value obtained by incrementing this value is adopted as the copy-number print number and the image data of File A also is acquired (step S610). Control then proceeds to step S612.

In case of box print at step S612, the copy number and image data of the image-data section 1509 acquired at steps S611 and S610 are superimposed to generate a copy-number image and this image is transferred to the printer 300 and printed out thereby. Thus, the control unit 110 is equipped with an output unit serving as output means for outputting image data from the box.

In case of box transmit, the copy number and image data acquired at steps S611 and S610 are superimposed to generate a copy-number image and this image is transmitted to the destination in the selected transmission mode. A record of copy-number printing or copy-number transmission is obtained by setting file information, box number and copy number and storing it in the common box area 403, which is accessible only by an administrator, thereby making it possible to use the copy number and log to subsequently trace from which box an output was made.

After data has been output at step S608 or S612, the values 1505 of numbers of copies already output of both the File A and the common file (when it exists) indicated by the common-job ID of File A are updated by the amount of copies printed or transmitted (step S613). It is determined whether the value 1505 of number of copies already output of File A has attained the allowable-output copy number 1506 of File A and whether the automatic deletion flag 1507 is ON (step S614). If the result of the determination is that the value 1505 of number of copies already output of File A has attained the allowable-output copy number 1506 and that the automatic deletion flag 1507 is ON ("YES" at step S614), then it is further determined whether File A has a common-job ID (step S615). If the result of the determination is that File A does have a common-job ID ("YES" at step S615), then control proceeds to step S616; otherwise ("NO" at step S615), control proceeds to step S618.

It is determined at step S616 whether the limit on number of output copies of the common file has been attained and whether the deletion flag of the common file is ON. If the result of the determination is that the limit on number of output copies of the common file has been attained and that the deletion flag of the common file is ON ("YES" at step S616), then control proceeds to step S617. If either of these conditions is not satisfied ("NO" at step S616), then control proceeds to step S618.

The common file is deleted at step S617 and control proceeds to step to step S618. Here the File A is deleted and processing is exited. Processing is exited also in a case where a "NO" decision is rendered at step S614.

By virtue of the method described above, storage of data is possible without using a large amount of storage capacity even in a case where the data is stored upon designating a plurality of areas in the box area 402 of hard disk 162. Further, even in a case based upon image data that has been registered in each of a plurality of boxes, it is possible to append a serial copy number of the image data and output the copy number of printout or transmission. It is also possible to leave a record indicating the relationship between the box number for which an output has been made and the copy-number print number. That is, this makes it possible to facilitate management of output data. Furthermore, when data is stored, a copy-number limit that allows output is appended to each box in which data is stored and a file is deleted automatically upon end of printing of the number of copies allowed. This facilitates management of output material relating to data that has been registered in a plurality of boxes.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

In accordance with the present invention, identical data that has been distributed to a plurality of users is not stored in a plurality of personal boxes within an information processing apparatus. As a result, the storage capacity of a hard disk is exploited unnecessarily. In addition, output of this data by the users who manage respective ones of the personal boxes can be managed appropriately by the original distributor of the data.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-340803 filed on Nov. 25, 2004, which is hereby incorporated by reference herein.

What is claimed is:

1. A printing control apparatus having a plurality of box areas for storing print data comprising:
   a first receiving unit configured to receive print data;
   a second receiving unit configured to receive a first permitted copy number of a first box area of the plurality of box areas and a second permitted copy number of a second box area of the plurality of box areas, wherein the first permitted copy number and the second permitted copy number are different from each other and the first and second permitted copy numbers are used for limiting printing based on the print data;
   a first storage control unit configured to store the print data in a common box area of the plurality of box areas;
   a generating unit configured to generate a reference file based on the print data stored in the common box area, the reference file referencing to the print data stored in the common box area;
   a second storage control unit configured to store the reference file in each of the first and second box areas;
   a display control unit configured to display a screen, wherein the first permitted copy number to print the print data from the first box area is displayed on the screen if the first box area is designated to print;
   a performing unit configured to perform print processing using the print data stored in the common box area referenced by the reference file in the first box area if an instruction to print the print data from the first box area is input via the screen; and
   a first deleting unit configured to delete the print data stored in the common box area if the printed number of the print data satisfies with a predetermined condition.

2. The apparatus according to claim 1, further comprising:
   in the case where a copy-number print function is instructed so that a serial number of copies is respectively printed on printing media,
   an output control unit configured to output based on the print data in such a manner that the serial number of copies is printed on each of the printing media;
   wherein the first storage control unit stores the print data in the common box area, if the copy-number print function is instructed and a designated number of box areas is plural.

3. The apparatus according to claim 2, wherein said output control unit forms the serial number regarding the print data when the print data stored in a common box area linked to the plurality of box areas designated is output.

4. A printing control method for controlling a printing apparatus having a plurality of box areas for storing print data comprising:
   a first receiving step of receiving a print job;
   a second receiving step of receiving a first permitted copy number of a first box area of the plurality of box areas and a second permitted copy number of a second box area of the plurality of box areas, wherein the first permitted copy number and the second permitted copy number are different from each other and the first and second permitted copy numbers are used for limiting printing based on the print data;

a first storage control step of storing the print data in a common box area of the plurality of box areas;

a generating step of generating a reference file based on the print data stored in the common box area, the reference file referencing to the print data stored in the common box area;

a second storage control step of storing the reference file in each of the first and second box areas;

a display control step of displaying a screen, wherein the first permitted copy number to print the print data from the first box area is displayed on the screen if the first box area is designated to print;

a performing step of performing print processing using the print data stored in the common box area referenced by the reference file in the first box area if an instruction to print the print data from the first box area is input via the screen; and a first deleting step of deleting the print data stored in the common box area if the printed number of the print data satisfies with a predetermined condition.

5. The method according to claim 4, further comprising:

in the case where a copy-number print step is instructed so that a serial number of copies is respectively printed on printing media, an output control step of outputting based on the print data in such a manner that the serial number of copies is printed on each of the printing media;

wherein the first storage control step stores the print data in the common box area, if the copy-number print step is instructed and a designated number of box areas is plural.

6. The method according to claim 5, wherein said output control step forms the serial number regarding the print data when the print data stored in a common box area linked to the plurality of box areas designated is output.

7. A program stored on a non-transitory computer readable medium accessed by a printing apparatus having a plurality of box areas for storing print data the program causing the printing apparatus to execute the following procedures:

a first receiving procedure for receiving print data;

a second receiving procedure for receiving a first permitted copy number of a first box area of the plurality of box areas and a second permitted copy number of a second box area of the plurality of box areas, wherein the first permitted copy number and the second permitted copy number are different from each other and the first and second permitted copy numbers are used for limiting printing based on the print data;

a first storage control procedure for storing the print data in a common box area of the plurality of box areas;

a generating procedure for generating a reference file based on the print data stored in the common box area, the reference file referencing to the print data stored in the common box area;

a second storage control procedure for storing the reference file in each of the first and second box areas;

a display control procedure for displaying a screen, wherein the first permitted copy number to print the print data from the first box area is displayed on the screen if the first box area is designated to print;

a performing procedure for performing print processing using the print data stored in the common box area referenced by the reference file in the first box area if an instruction to print the print data from the first box area is input via the screen; and a first deleting procedure for deleting the print data stored in the common box area if the printed number of the print data satisfies with a predetermined condition.

* * * * *